United States Patent [19]

Brown et al.

[11] 3,855,081

[45] Dec. 17, 1974

[54] CHEMICAL PROCESS
[75] Inventors: Christopher John Brown, Tadworth; Roderick F. Neale, Great Boykham, both of England
[73] Assignee: BP Chemicals Limited, London, England
[22] Filed: Sept. 10, 1973
[21] Appl. No.: 395,981

Related U.S. Application Data
[63] Continuation of Ser. No. 135,744, April 20, 1971, abandoned.

[52] U.S. Cl. .................... 203/91, 203/8, 260/526 N
[51] Int. Cl. ...................... B01d 3/10, C07c 57/04
[58] Field of Search .............. 203/91, 8; 260/526 N

[56] References Cited
UNITED STATES PATENTS

| | | | |
|---|---|---|---|
| 3,493,471 | 2/1970 | Bashaw | 203/8 |
| 3,527,677 | 9/1970 | Harpring | 203/8 |
| 3,689,541 | 9/1972 | Sennewald et al. | 260/526 N |

Primary Examiner—Wilbur L. Bascomb, Jr.
Attorney, Agent, or Firm—Brooks, Haidt & Haffner

[57] ABSTRACT

Acrylic acid is purified by removal of inter alia protoanemonin by fractional distillation under controlled conditions to recover pure acrylic acid as distillate.

3 Claims, No Drawings

CHEMICAL PROCESS

This is a continuation of application Ser. No. 135,744, filed Apr. 20, 1971, now abandoned.

The present invention relates to the purification of unsaturated aliphatic carboxylic acids and in particular to the purification of acrylic acid.

It is known to produce acrylic acid by the vapour phase catalytic oxidation of propylene or acrolein with molecular oxygen. It is also known to polymerise such acrylic acid or to copolymerise it with other polymerisable monomers e.g. acrylonitrile.

It has been found that acrylic acid prepared in this way may give rise to long reaction times or the need for increased quantities of initiator when used in polymerisation processes, and it is believed that this may be due to the unexpected presence of an impurity which inhibits the polymerisation rate.

It is an object of the present invention to provide a means of purifying acrylic acid to produce an acceptable polymerisation grade.

According to the present invention a process for the purification of acrylic acid produced by the vapour phase catalytic oxidation of propylene or acrolein with the molecular oxygen comprises fractionally distilling acrylic acid in a column having at least 10 distillation trays and operating with return of reflux to the column, and removing the purified acrylic acid as a fraction boiling in the range of 53° to 57° at 20–22 mm Hg or equivalent temperature and pressure conditions from the upper part of the column.

The distillation may be carried out latchwise or continuously.

The distillation may suitably be carried out in an Oldershaw column, although any conventional distillation column having at least 10 and preferably at least 20 trays may be used, and when operating under the conditions of the invention it is found that about 70 to 80 percent of the acid may be obtained as pure polymerisation grade acid. The pure acid fraction may be taken as an overhead fraction from the column but when operating continuously is preferably a fraction taken as a side stream from the upper part of the column.

An example of a suitable column for use in carrying out the process of the present invention is a column of 20 trays operating with a heads pressure of about 20 mm Hg corresponding to a base temperature of about 90° C with introduction of feed at a point in the column about 6 trays from the base and removal of purified acid from about the 4th tray down from the top of the column. Such a column would operate using a reflux ratio of about 10:1 and with a kettle bleed corresponding to 30 percent of the feed. The purified acid removed from the 4th tray would correspond to about 60 percent of the feed and assuming about 0.2 percent w/w of impurity in the original feed, would contain approximately 10 ppm of material other than acrylic acid.

The quality of acid produced by the above distillation procedure may be analysed for impurity content by a gas-liquid chromatography procedure using stationary phases such as Carbowax 20, or Poropak Q. Alternatively, the refined acid may be subjected to a polymerisation test under controlled conditions. Either of these procedures may be used as an analytical control method for the operation of a plant scale distillation unit.

According to a further aspect of the present invention it has been found that an impurity present in the acrylic acid and which is removed by the above described process is the substance protoanemonin (1) having the structure,

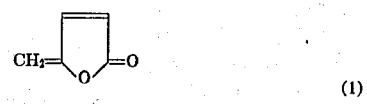

(1)

The process of the present invention is illustrated by the following example:

EXAMPLE

A mixture of propylene, air and steam in volume proportions 7:63:30 was passed through a bed of catalyst comprising an oxide composition containing antimony/tin/vanadium in the atom ratio 2:1:1 respectively. The inlet of the bed was diluted with 32 w/w hydronyl. The reactor was operated at a temperature of 376°, an inlet gas pressure of 25 p.s.i.g. and with a contact time of 3 seconds. The reactor effluent was fed directly into a second reactor which contained a catalyst comprising an oxide composition containing cobalt/molybdenum in atomic ratio 1:1 respectively. This second reactor was operated at a temperature of 366° an inlet pressure of 21 p.s.i.g. and with a contact time of 3 seconds. After condensation and separation of residual low-boiling materials (nitrogen, carbon oxides, acetaldehyde, acrolein) the aqueous product contained, acrylic acid, 15.4 percent w/w; acetic acid, 3.7 percent; formaldehyde 0.7 percent; maleic acid 0.4 percent and protoanomonin, 0.01 percent.

This stream was subjected to continuous liquid-liquid extraction in a rotating disc contactor (272 r.p.m.) with isopropyl acetate solvent. The extract contained isopropyl acetate 65.5 percent w/w; acrylic acid, 18.9 percent; acetic acid, 2.3 percent; protoanomonin, 0.015 percent with traces of water, formaldehyde, acrolein, propionic acid, maleic and fumaric acids.

After the stripping of isopropyl acetate solvent in a 30 plate × 1 in. I.D. Oldershaw column fitted with a thermosiphon reboiler and reflux divider operating at 12 kN/m² pressure, the main product stream contained: acrylic acid, 66.1 percent w/w; acetic acid, 27.0 percent; protoanemonin, 0.04 percent and traces of formaldehyde, propionic acid and isopropyl acetate. The crude acid product stream was distilled in a 1 in. I.D. × 45 plate Oldershaw column operating at 5.3 kN/m² pressure to give a base product comprising acrylic acid, 91.6 percent w/w; protoanemonin, 0.05 percent and traces of carboxylic acids.

This product stream was further distilled in a 20 plate Oldershaw column fitted with a reflux dividing head. Distillation was commenced under a pressure of 20–22 mm Hg.

The table shows the quality of various fractions of acid taken from the still. Fractions 1–7 comprised good acrylic acid while fraction No. 8 contained inhibitor and was slow to polymerise.

Polymerisation Test Procedure 5 ml. of the acid under test was sealed into a glass tube (2½ in. × ½ in.) with 1 percent w/w benzoyl peroxide polymerisation initiator and immersed in a constant temperature bath at 60°C. The time measured from immersion to the first appearance of precipitated polymer ($T_1$) and the time to a vigorous reaction or complete polymerisation ($T_2$) were noted.

Good monomers are characterised by having a small value for $T_1$, with $T_1$ almost equal to $T_2$. Poor monomers have large values for both $T_1$ and $T_2$.

TABLE

Fractionation of Acrylic Acid

| Fraction No. | Pressure mm Hg | Temperature °C | % distilled | Time $T_1$ | Minutes $T_2$ | Protoanemonin conc. p.p.m. |
|---|---|---|---|---|---|---|
| Kettle charge | | | | 60 | 300 | 500 |
| 1 | 20 | 53 | 21.6 | 9 | 14.5 | <20 |
| 2 | 20 | 53 | 31.0 | 9 | 16.5 | <20 |
| 3 | 22 | 55–57 | 41.3 | 8.25 | 10.5 | <20 |
| 4 | 22 | 57 | 51.0 | 8.25 | 9.75 | <20 |
| 5 | 22 | 57 | 61.0 | 8.5 | 9.75 | <20 |
| 6 | 22 | 57 | 70.2 | 9 | 10.5 | <20 |
| 7 | 22 | 57 | 77.7 | 10.75 | 15 | <20 |
| 8 | 22 | 58–59 | 87.6 | 40 | 230 | 375 |

We claim:

1. A method for improving the quality of acrylic acid monomer containing more than 20 ppm of protoanemonin having the structure

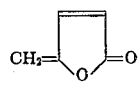

which comprises removing protoanemonin from the monomer by fractional distillation in a column having at least 10 distillation trays and operating with return of reflux to the column, and removing acrylic acid monomer substantially free from protoanemonin as a fraction boiling in the range of about 53° to 57°C at 20–22 mmHg from the upper part of the column.

2. A process as defined in claim 1 wherein the distillation column has at least 20 distillation trays.

3. A process as defined in claim 1 wherein the acrylic acid removed from the column contains less than 20 ppm of protoanemonin.

* * * * *